United States Patent
Shi et al.

(10) Patent No.: US 7,907,348 B2
(45) Date of Patent: Mar. 15, 2011

(54) MICROSCOPE OBJECTIVE

(75) Inventors: Renhu Shi, Goettingen (DE); Werner Kleinschmidt, Adelebsen (DE); Thomas Bocher, Goettingen (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 1 day.

(21) Appl. No.: 12/299,424

(22) PCT Filed: Apr. 26, 2007

(86) PCT No.: PCT/EP2007/003673
§ 371 (c)(1),
(2), (4) Date: Jun. 15, 2009

(87) PCT Pub. No.: WO2007/128422
PCT Pub. Date: Nov. 15, 2007

(65) Prior Publication Data
US 2009/0284841 A1   Nov. 19, 2009

(30) Foreign Application Priority Data

May 5, 2006   (DE) .......................... 10 2006 021 520

(51) Int. Cl.
*G02B 21/02* (2006.01)
(52) U.S. Cl. .......................... 359/656; 359/661; 359/368
(58) Field of Classification Search .......... 359/656–661, 359/368
See application file for complete search history.

(56) References Cited

U.S. PATENT DOCUMENTS

| 3,598,474 A | 8/1971 | Shoemaker |
| 3,912,378 A | 10/1975 | Goto |
| 4,376,570 A | 3/1983 | Sussman |
| 5,898,524 A | 4/1999 | Ryzhikov |
| 5,978,147 A | 11/1999 | Kudo |
| 6,519,092 B2 * | 2/2003 | Yamaguchi ............... 359/656 |
| 7,046,451 B2 * | 5/2006 | Mandai et al. ............. 359/661 |
| 7,133,212 B2 | 11/2006 | Wartmann et al. |
| 2002/0154414 A1 | 10/2002 | Matthae et al. |
| 2006/0082896 A1 | 4/2006 | Mandai et al. |
| 2006/0087745 A1 | 4/2006 | Fahlbusch et al. |

FOREIGN PATENT DOCUMENTS

| DE | 2 405 698 | 8/1974 |
| DE | 101 08 796 A1 | 9/2002 |
| DE | 10 2004 036 114 A1 | 2/2006 |
| DE | 10 2004 051 357 A1 | 4/2006 |

* cited by examiner

*Primary Examiner* — Evelyn A. Lester
(74) *Attorney, Agent, or Firm* — Patterson Thuente Christensen Pedersen, P.A.

(57) ABSTRACT

The invention relates to a microscope objective with preferably anti-symmetric lenses or lens groups with an optical magnification of −100 and a visual field factor of 20.

According to the invention the microscope objective consists of 9 lenses with 3 cemented elements, starting from the object side (left), a lens which is almost a hemisphere $L_1$ with positive refractive power, a meniscus lens $L_2$ with positive refractive power, a two-part cemented element $G_1$ with positive refractive power, another two-art cemented element $G_2$ with positive refractive power, a two-part cemented element $G_3$ with negative refractive power, and finally a meniscus lens $L_9$ with negative refractive power.

By using cemented elements and lens pairings of the same construction, production costs can be reduced compared with methods of the prior art while image contrast is improved.

13 Claims, 3 Drawing Sheets

Lens cross-section of the objective with the tube, $f'_{Tubus}$=200 mm

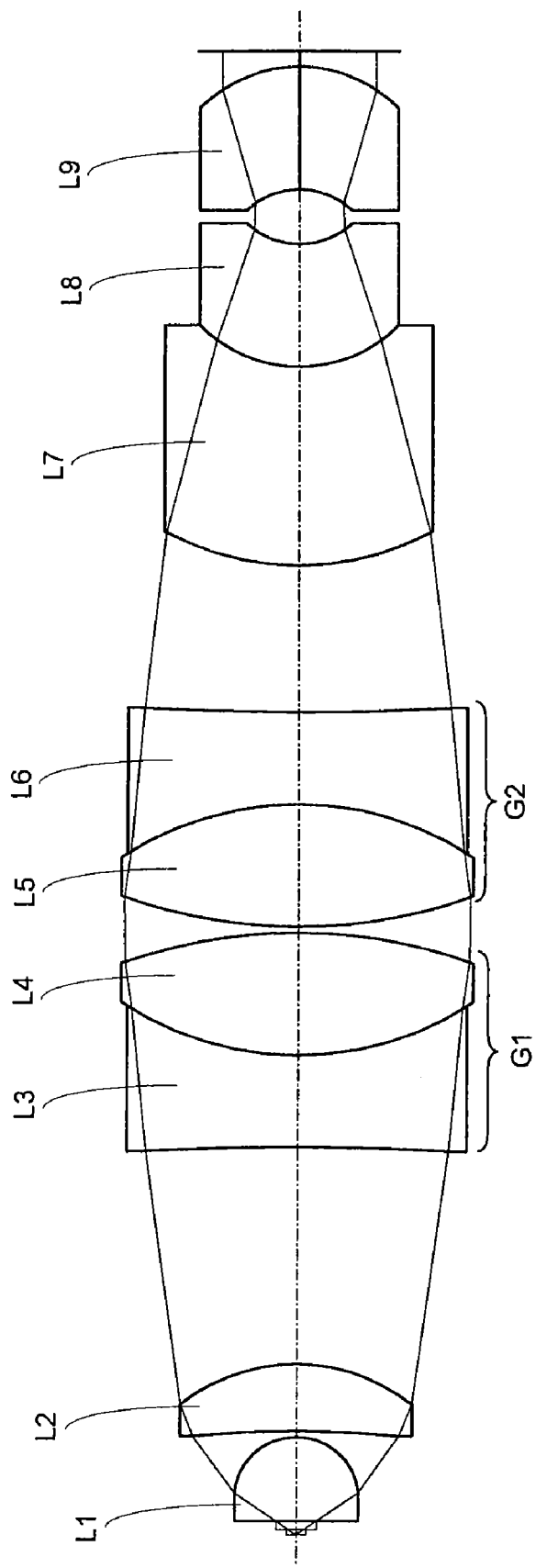
Fig. 1 Lens cross-section of the objective with the tube, f'$_{Tubus}$=200 mm

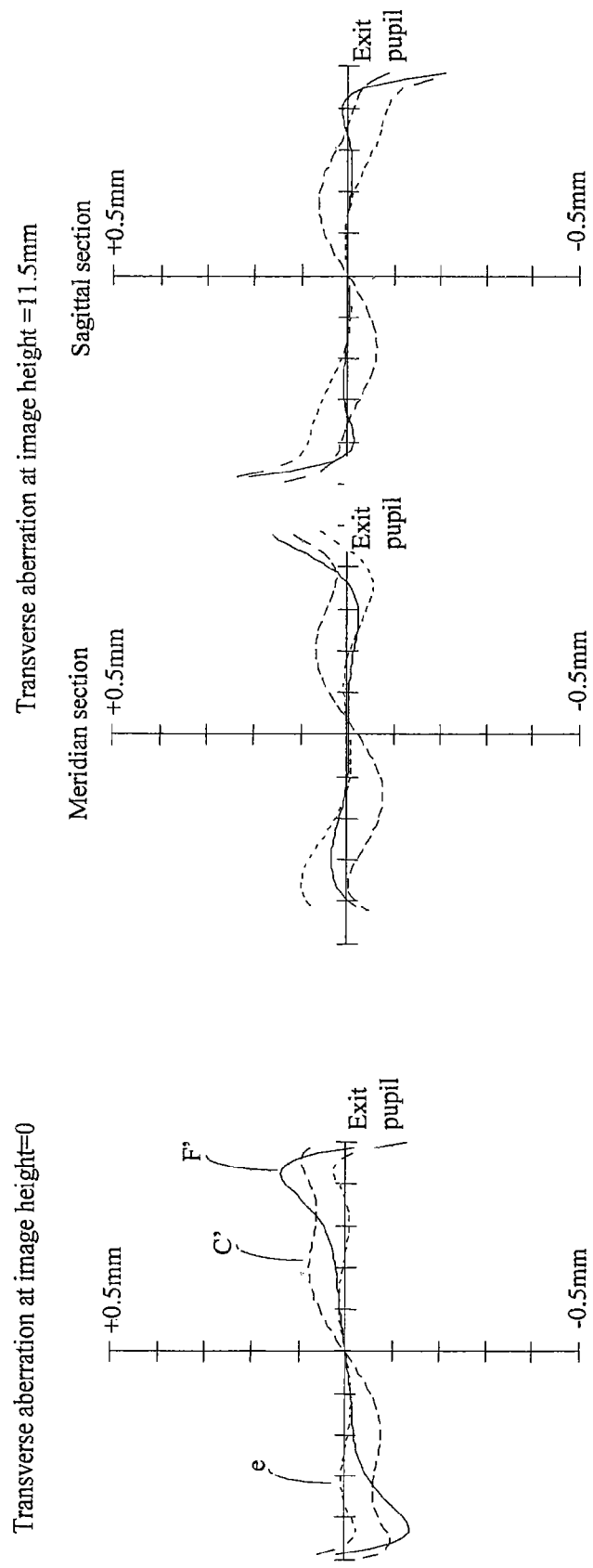
Fig. 2 Transverse aberrations with the tube, $f'_{Tubus}=200$ mm

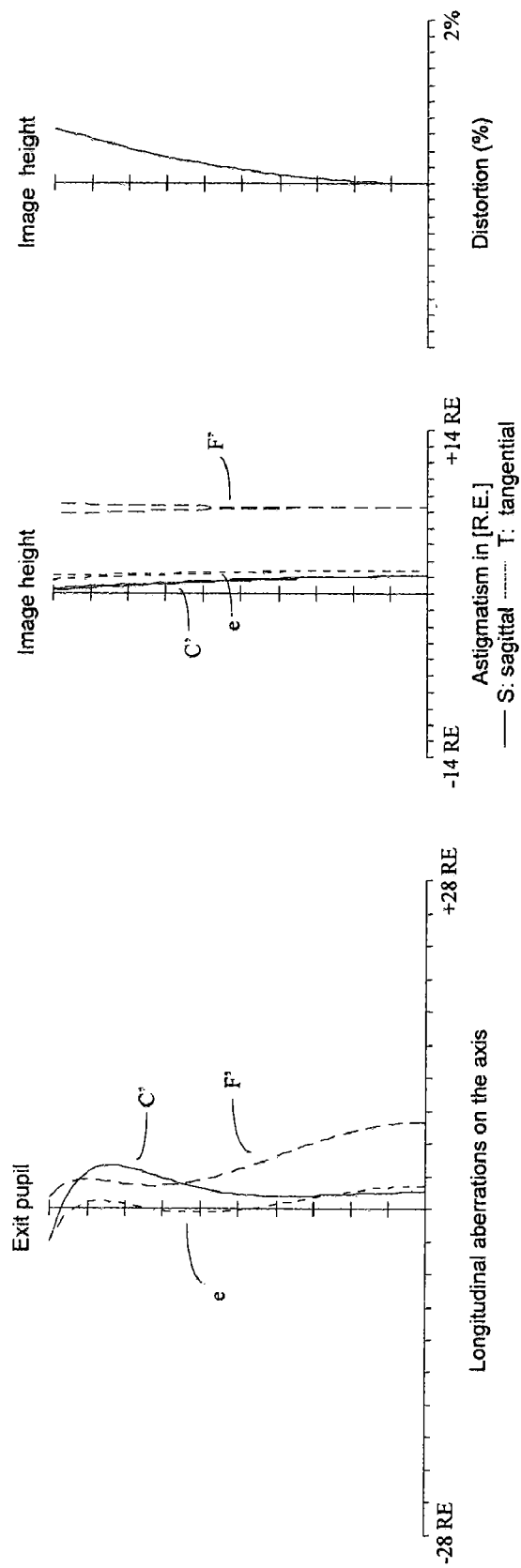
Fig. 3 Longitudinal aberrations on the axis and field-dependent image defects

MICROSCOPE OBJECTIVE

PRIORITY CLAIM

The present application is a National Phase entry of PCT Application No. PCT/EP2007/003673, filed Apr. 26, 2007, which claims priority from German Application Number 102006021520.6, filed May 5, 2006, the disclosures of which are hereby incorporated by reference herein in their entirety.

FIELD OF THE INVENTION

For examination of biological objects and of tissue cultures use is made of microscope objectives having a large numerical aperture so as to resolve the fine structure.

BACKGROUND

The microscope objectives with a numerical aperture of greater than 1.2 and using immersion oil usually also have higher production costs. This is partially due to the fact that the front part of the corresponding objective consists of a two-part cemented element, i.e. one which comprises a planoconvex lens and a meniscus lens. Due to the special method of manufacture, the production of such a cemented element is complex and expensive. Objectives with a front part consisting of only one hemisphere lens may reach an aperture of up to 1.3 and have lower production costs.

SUMMARY OF THE INVENTION

In view of the disadvantages of the prior art, it is an object of the invention to improve a microscope objective such that, by improvement of the image contrast, a further reduction in production costs is achieved.

Alternatively, the solution according to the invention relates to three microscope objective variants of the "planachromat" class having an optical magnification of −100 and a visual field factor of 20. A planachromat is defined by the coincidence in focal position of the spectral lines C' and F'. The additional term "plan" means that the image field is suitably flattened. The object-side numerical aperture is 1.25.

The microscope objective consists of 9 lenses comprising 3 cemented elements. The image contrast is influenced at the first line by the image defects. In the present microscope objectives, image defects such as spherical aberration, coma, astigmatism and distortion, are corrected to a further extent. The primary longitudinal chromatic aberration (image of the focus positions between the spectral lines C' and F') has been corrected. The longitudinal chromatic aberration of the secondary spectrum (deviation of the focus positions between the spectral lines C'-e and F'-e) is within the range of the triple depth of focus. The range of the focal depth is defined by $\lambda/NA^2$ with NA as the numerical aperture. This range is referred to as a Rayleigh unit. Image field flattening is reduced such that the best focus position at the field edge deviates by less than two focal depths from the axial focus position.

The use of repetitive components allows a further reduction in production costs. Such a microscope objective offers customers flexibility and the cost benefit.

In the following, three example embodiments of microscope objectives of the "planachromat" class with an optical magnification of −100, a numerical aperture of 1.25 and a visual field factor 20 will be presented. The optical working distance is 0.28 mm. It is the distance between the cover glass and the vertex of the first lens surface in the system. The system data are indicated in Tables 1 to 3.

BRIEF DESCRIPTION OF THE DRAWINGS

In the respective Figures,

FIG. 1 shows a lens segment of the objective with the tube $f'_{Tubus}=200$ mm

FIG. 2 shows transverse aberrations with the tube, $f'_{Tubus}=200$ mm

FIG. 3 shows longitudinal aberrations on the axis and field-dependent image defects.

DETAILED DESCRIPTION

The objective in the example embodiment 1 in Table 1 is calculated together with a tube lens having a focal length of 180 mm, thus correcting the transverse chromatic aberrations on the edge of the field respectively to −50 μm (C'-e) and 50 μm (F'-e). This correction of the longitudinal chromatic aberration is required for a specific device. The objective in the example embodiment 2 in Table 2 is calculated together with a tube lens having a focal length of 200 mm; in this case, the chromatic aberrations in the objective and in the tube system are each corrected by themselves. The example embodiment 3 in Table 3 is calculated together with a tube lens having a focal length of 164.5 mm; in this case, the transverse chromatic aberrations in the objective and in the tube system are mutually compensated for. By slight changes, the construction of these alternative microscope objectives meet different demands in terms of transverse chromatic aberrations.

The system data of the three example embodiments are similar. Therefore, only example embodiment 2 will be referred to for the graphic representations. The lens cross-section is shown in FIG. 1. The corresponding profiles of the image defects as a function of the aperture and of the visual field are respectively shown in FIG. 2 and FIG. 3.

The microscope objectives each consist of 9 lenses with 3 cemented elements, to be precise: (counted starting from the object; see FIG. 1) a lens $L_1$ with positive refractive power, a positive meniscus lens $L_2$, a two-part cemented element $G_1$ with positive refractive power, another two-part cemented element $G_2$ with positive refractive power, a two-part cemented element $G_3$ with negative refractive power and finally a meniscus lens $L_9$ with negative refractive power. The cemented elements $G_1$ and $G_2$ are of identical construction and are built into the system with mirror symmetry (FIG. 1). Further, the lenses $L_8$ and $L_9$ are of identical construction, and they are also built into the objective with mirror symmetry. This results in three pairs of lenses, namely $L_3$ and $L_6$, $L_4$ and $L_5$, $L_8$ and $L_9$, each being of identical construction. This allows an effective reduction in production costs.

The lens $L_1$ has a plane surface on the object side and a strongly curved surface on the image side, and the center of curvature is located on the object side. The lens $L_2$ is meniscus-shaped and the two centers of curvature are located on the object side. The cemented element $G_1$ is composed of a biconcave lens $L_3$ on the object side and a biconvex lens $L_4$ on the image side. The cemented element $G_2$ consists of a biconvex lens $L_4$ on the object side and a biconcave lens $L_5$ on the image side. The cemented element $G_3$ is composed of two meniscus lenses $L_7$ and $L_8$, and the centers of curvature of all surfaces are located on the image side. The two lenses $L_7$ and $L_8$ have negative refractive power. The centers of curvature of the last meniscus lens $L_9$ are located on the object side.

Image defects, such as, for example, spherical aberration, coma, astigmatism and distortion, are corrected to a large extent. The primary longitudinal chromatic aberration is corrected. The longitudinal chromatic aberration of the secondary spectrum is within the range of the triple focal depth. Image field flattening is reduced such that the best focus position on the edge of the field deviates from the axial focus position by less than two focal depths. The different aberrations are graphically represented in FIG. 2 and FIG. 3.

The following Tables show the system data of the example embodiments, and the designation of the surfaces (surface no.) starts from the object plane (beginning on the left).

TABLE 1

System data of example embodiment 1

| Surface No. | Radius | Thickness | $n_e$ | $v_e$ |
|---|---|---|---|---|
| 1 | Planar | 0.170 | 1.525 | 59.2 |
| (Cover glass) | | | | |
| 2 | Planar | 0.290 | 1.518 | 41.8 |
| (Oil) | | | | |
| 3 | Planar | 2.770 | 1.517 | 60.3 |
| 4 | −2.0004 | 0.200 | | |
| 5 | −17.4139 | 2.200 | 1.758 | 52.1 |
| 6 | −5.2970 | 6.483 | | |
| 7 | −99.0800 | 3.000 | 1.762 | 27.3 |
| 8 | 10.3510 | 4.000 | 1.667 | 54.3 |
| 9 | −17.4720 | 0.200 | | |
| 10 | 17.4720 | 4.000 | 1.667 | 54.3 |
| 11 | −10.3510 | 3.000 | 1.762 | 27.3 |
| 12 | 99.0800 | 5.329 | | |
| 13 | 7.6990 | 6.500 | 1.489 | 70.0 |
| 14 | 4.6560 | 4.000 | 1.813 | 25.3 |
| 15 | 2.4300 | 1.796 | | |
| 16 | −2.4300 | 4.000 | 1.813 | 25.3 |
| 17 | −4.6560 | 0.622 | | |
| 18 | Planar | 60.000 | | |

+achromatized tube lenses having a focal length of 180 mm

Numerical aperture = 1.25
optical magnification = −100.5
visual field factor = 20
Position of entrance pupil −∞
Object on surface 1

TABLE 2

System data of example embodiment 2

| Surface No. | Radius | Thickness | $n_e$ | $v_e$ |
|---|---|---|---|---|
| 1 | Planar | 0.170 | 1.525 | 59.2 |
| (Cover glass) | | | | |
| 2 | Planar | 0.281 | 1.518 | 41.8 |
| (Oil) | | | | |
| 3 | Planar | 2.770 | 1.517 | 60.3 |
| 4 | −1.9845 | 0.200 | | |
| 5 | −32.1451 | 2.200 | 1.758 | 52.1 |
| 6 | −5.8498 | 7.127 | | |
| 7 | −87.1808 | 3.000 | 1.762 | 27.3 |
| 8 | 10.0650 | 4.000 | 1.667 | 54.3 |
| 9 | −16.4805 | 0.200 | | |
| 10 | 16.4805 | 4.000 | 1.667 | 54.3 |
| 11 | −10.0650 | 3.000 | 1.762 | 27.3 |
| 12 | 87.1808 | 4.823 | | |
| 13 | 8.8700 | 6.500 | 1.489 | 70.0 |
| 14 | 4.4577 | 4.000 | 1.813 | 25.3 |
| 15 | 2.4528 | 1.800 | | |
| 16 | −2.4528 | 4.000 | 1.813 | 25.3 |
| 17 | −4.4577 | 0.500 | | |
| 18 | Planar | 100.000 | | |

+achromatized tube lenses with a focal length of 200 mm

Numerical aperture = 1.25
optical magnification = −100.1
visual field factor = 20
Position of entrance pupil −∞
Object on surface 1

TABLE 3

System data of example embodiment 3

| Surface No. | Radius | Thickness | $n_e$ | $v_e$ |
|---|---|---|---|---|
| 1 | Planar | 0.170 | 1.525 | 59.2 |
| (Cover glass) | | | | |
| 2 | Planar | 0.286 | 1.518 | 41.8 |
| (Oil) | | | | |
| 3 | Planar | 2.770 | 1.517 | 60.3 |
| 4 | −1.9995 | 0.200 | | |
| 5 | −15.9107 | 2.200 | 1.758 | 52.1 |
| 6 | −5.2115 | 6.535 | | |
| 7 | −158.4628 | 3.000 | 1.762 | 27.3 |
| 8 | 10.3216 | 4.000 | 1.667 | 54.3 |
| 9 | −18.4453 | 0.200 | | |
| 10 | 18.4453 | 4.000 | 1.667 | 54.3 |
| 11 | −10.3216 | 3.000 | 1.762 | 27.3 |
| 12 | 158.4628 | 5.402 | | |
| 13 | 7.3766 | 6.500 | 1.489 | 70.0 |
| 14 | 4.7935 | 4.000 | 1.813 | 25.3 |
| 15 | 2.3928 | 1.800 | | |
| 16 | −2.3928 | 4.000 | 1.813 | 25.3 |
| 17 | −4.7935 | 0.500 | | |
| 18 | Planar | 126.500 | | |

+a tube lens with a focal length of 164.5 mm

Numerical aperture = 1.25
optical magnification = −100.2
visual field factor = 20
Position of entrance pupil −∞
Object on surface 1

The invention claimed is:

1. A microscope optical system comprising:
a microscope objective including anti-symmetric lenses or lens groups;
wherein image defects of the microscope objective, selected from a group consisting of spherical aberration, coma, astigmatism, distortion and a combination of the forgoing, are largely corrected;
primary longitudinal chromatic aberration of the microscope objective is corrected;
nominal optical magnification of the microscope objective is −100 for a numerical aperture, using oil immersion, of 1.25; and
longitudinal chromatic aberrations of the microscope objective for a secondary spectrum are within the range of a triple depth of focus, and image field flattening of the microscope objective is reduced such that a best focus position on an edge of the field differs by less than two depths of focus from an axial focus position.

2. The microscope optical system as claimed in claim 1 wherein the microscope objective comprises 9 lenses with 3 cemented elements, including starting from an object side, a lens which is almost a hemisphere $L_1$ with positive refractive power, a meniscus lens $L_2$ with positive refractive power, a two-part cemented element $G_1$ with positive refractive power, another two-part cemented element $G_2$ with positive refractive power, a two-part cemented element $G_3$ with negative refractive power, and a meniscus lens $L_9$ with negative refractive power, wherein the lens $L_1$ has a plane surface on the object side and a strongly curved surface on an image side thereof and a center of curvature is located on the object side thereof; the lens $L_2$ is meniscus-shaped and the two centers of curvature are located on the object side thereof; the cemented element $G_1$ including a biconcave lens $L_3$ on an object side thereof and a biconvex lens $L_4$ on an image side thereof; the cemented element $G_2$ including a biconvex lens $L_4$ on an object side thereof and a biconcave lens $L_5$ on an image side thereof; the cemented element $G_3$ comprising two meniscus lenses $L_7$ and $L_8$, and the centers of curvature of all surfaces of $L_7$ and $L_8$ are located on an image side thereof and both lenses $L_7$ and $L_8$ have negative refractive power.

3. The microscope optical system as claimed in claim 2, wherein the following ratios of the focal lengths apply:

$$1.9 < f_{L1}/f_{Obj.} < 2.4$$

$$4.5 < f_{L2}/f_{Obj.} < 5.7$$

$$20.2 < f_{G1}/f_{Obj.} < 25.7$$

$$20.2 < f_{G2}/f_{Obj.} < 25.7$$

$$-14.7 < f_{G3}/f_{Obj.} < -8.2$$

$$-31.7 < f_{L9}/f_{Obj.} < -14.2$$

wherein $f_{Obj.}$ is the focal length of the objective.

4. The microscope optical system as claimed in claim 2 wherein the cemented elements $G_1$ and $G_2$ of the microscope objective are of identical construction and are built into the microscope objective with mirror symmetry, the lenses $L_8$ and $L_9$ are of identical construction and are built into the microscope objective with mirror symmetry, resulting in three pairs of lenses, $L_3$ and $L_6$; $L_4$ and $L_5$; $L_8$ and $L_9$, each being of identical construction.

5. The microscope optical system as claimed in claim 4, wherein the lenses $L_4$ and $L_5$ of identical construction satisfy the following conditions:

$$n_e > 1.66; \text{ and}$$

$$v_e > 54.$$

6. The microscope optical system as claimed in claim 4, wherein the lenses $L_8$ and $L_9$ of identical construction satisfy the following conditions:

$$n_e > 1.81; \text{ and}$$

$$v_e < 26.$$

7. The microscope optical system as claimed in claim 1, wherein geometry of the lens $L_1$ satisfies the following conditions:

$$d_3 \geq |r_4| \geq \frac{d_1 \cdot NA}{\sqrt{n_1^2 - NA^2}} + \frac{d_2 \cdot NA}{\sqrt{n_2^2 - NA^2}} + \frac{d_3 \cdot NA}{\sqrt{n_3^2 - NA^2}}$$

wherein
$d_1$ is the thickness of the cover glass;
$d_2$ is the optical working distance;
$d_3$, $r_4$ respectively are the center thickness and the radius of curvature of the lens $L_1$;
NA is the numerical aperture; and
ne is the refractive index ve for the Abbe number at the spectral line e=546.07 nm.

8. The microscope optical system as claimed in claim 1, further comprising a tube system having a focal length of 180 mm arranged relative to the objective such that rays which come from an object point are parallel to each other between the objective and the tube lens system.

9. The microscope optical system as claimed in claim 1, further comprising a tube system having a focal length of 200 mm, arranged relative to the objective such that rays which come from an object point are parallel to each other between the objective and the tube lens system and wherein chromatic aberrations of the objective and of the tube lens system are corrected separately from each other.

10. The microscope optical system as claimed in claim 1, further comprising a tube lens having a focal length of 164.5 mm; wherein chromatic aberration of the microscope objective is corrected according to the "ICS" (Infinite Colour Correction System) principle and wherein the chromatic aberration of the microscope objective and chromatic aberration tube lens system compensate each other.

11. The microscope optical system as claimed in claim 1, wherein the objective lens meets the following parameters:

| Surface No. | Radius | Thickness | $n_e$ | $v_e$ |
| --- | --- | --- | --- | --- |
| 1 (Cover glass) | Planar | 0.170 | 1.525 | 59.2 |
| 2 (Oil) | Planar | 0.290 | 1.518 | 41.8 |
| 3 | Planar | 2.770 | 1.517 | 60.3 |
| 4 | −2.0004 | 0.200 | | |
| 5 | −17.4139 | 2.200 | 1.758 | 52.1 |
| 6 | −5.2970 | 6.483 | | |
| 7 | −99.0800 | 3.000 | 1.762 | 27.3 |
| 8 | 10.3510 | 4.000 | 1.667 | 54.3 |
| 9 | −17.4720 | 0.200 | | |
| 10 | 17.4720 | 4.000 | 1.667 | 54.3 |
| 11 | −10.3510 | 3.000 | 1.762 | 27.3 |
| 12 | 99.0800 | 5.329 | | |
| 13 | 7.6990 | 6.500 | 1.489 | 70.0 |
| 14 | 4.6560 | 4.000 | 1.813 | 25.3 |
| 15 | 2.4300 | 1.796 | | |
| 16 | −2.4300 | 4.000 | 1.813 | 25.3 |
| 17 | −4.6560 | 0.622 | | |
| 18 | Planar | 60.000 | | |

+achromatized tube lenses having a focal length of 180 mm

Numerical aperture = 1.25
optical magnification = −100.5
visual field factor = 20
Position of entrance pupil −∞
Object on surface 1 and wherein the surfaces are numbered starting from an object plane.

12. The microscope optical system as claimed in claim 1, wherein the objective lens meets the following parameters:

| Surface No. | Radius | Thickness | $n_e$ | $v_e$ |
| --- | --- | --- | --- | --- |
| 1 (Cover glass) | Planar | 0.170 | 1.525 | 59.2 |
| 2 (Oil) | Planar | 0.281 | 1.518 | 41.8 |
| 3 | Planar | 2.770 | 1.517 | 60.3 |
| 4 | −1.9845 | 0.200 | | |
| 5 | −32.1451 | 2.200 | 1.758 | 52.1 |
| 6 | −5.8498 | 7.127 | | |
| 7 | −87.1808 | 3.000 | 1.762 | 27.3 |
| 8 | 10.0650 | 4.000 | 1.667 | 54.3 |
| 9 | −16.4805 | 0.200 | | |
| 10 | 16.4805 | 4.000 | 1.667 | 54.3 |
| 11 | −10.0650 | 3.000 | 1.762 | 27.3 |
| 12 | 87.1808 | 4.823 | | |
| 13 | 8.8700 | 6.500 | 1.489 | 70.0 |
| 14 | 4.4577 | 4.000 | 1.813 | 25.3 |
| 15 | 2.4528 | 1.800 | | |
| 16 | −2.4528 | 4.000 | 1.813 | 25.3 |
| 17 | −4.4577 | 0.500 | | |
| 18 | Planar | 100.000 | | |

+achromatized tube lenses with a focal length of 200 mm

Numerical aperture = 1.25
optical magnification = −100.1
visual field factor = 20
Position of entrance pupil −∞
Object on surface 1 and wherein the surfaces are numbered starting from an object plane.

13. The microscope optical system as claimed in claim 1, wherein the objective lens meets the following parameters:

| Surface No. | Radius | Thickness | ne | ve |
|---|---|---|---|---|
| 1 (Cover glass) | Planar | 0.170 | 1.525 | 59.2 |
| 2 (Oil) | Planar | 0.286 | 1.518 | 41.8 |
| 3 | Planar | 2.770 | 1.517 | 60.3 |
| 4 | −1.9995 | 0.200 | | |
| 5 | −15.9107 | 2.200 | 1.758 | 52.1 |
| 6 | −5.2115 | 6.535 | | |
| 7 | −158.4628 | 3.000 | 1.762 | 27.3 |
| 8 | 10.3216 | 4.000 | 1.667 | 54.3 |
| 9 | −18.4453 | 0.200 | | |
| 10 | 18.4453 | 4.000 | 1.667 | 54.3 |
| 11 | −10.3216 | 3.000 | 1.762 | 27.3 |
| 12 | 158.4628 | 5.402 | | |
| 13 | 7.3766 | 6.500 | 1.489 | 70.0 |
| 14 | 4.7935 | 4.000 | 1.813 | 25.3 |
| 15 | 2.3928 | 1.800 | | |
| 16 | −2.3928 | 4.000 | 1.813 | 25.3 |
| 17 | −4.7935 | 0.500 | | |
| 18 | Planar | 126.500 | | |

+a tube lens with a focal length of 164.5 mm

Numerical aperture = 1.25
optical magnification = −100.2
visual field factor = 20
Position of entrance pupil −∞
Object on surface 1 and wherein the surfaces are numbered starting from an object plane.

* * * * *

UNITED STATES PATENT AND TRADEMARK OFFICE
CERTIFICATE OF CORRECTION

PATENT NO. : 7,907,348 B2
APPLICATION NO. : 12/299424
DATED : March 15, 2011
INVENTOR(S) : Renhu Shi, Werner Kleinschmidt and Thomas Bocher It is certified that error appears in the above-identified patent and that said Letters Patent is hereby corrected as shown below:

Title page, items

87  PCT publication number missing "A1";
57  Abstract, Line 9, "two-art" should be "two-part".

Signed and Sealed this
Sixteenth Day of August, 2011

David J. Kappos
*Director of the United States Patent and Trademark Office*